United States Patent [19]
Fisher

[11] 3,960,339
[45] June 1, 1976

[54] SEAT BELT RETRACTOR

[76] Inventor: Robert C. Fisher, 580 E. Long Lake Road, Bloomfield, Mich. 48013

[22] Filed: Aug. 26, 1974

[21] Appl. No.: 500,582

[52] U.S. Cl. .......................... 242/107.4 R; 74/577 S
[51] Int. Cl.² ........................................... A62B 35/00
[58] Field of Search 242/107.4 R, 107.4 A–107.4 E; 188/82.7; 297/388, 386; 280/150 SB; 74/577 S, 576, 577 R, 577 SF, 577 M

[56] References Cited
UNITED STATES PATENTS

| | | | |
|---|---|---|---|
| 3,659,800 | 5/1972 | Meyer | 242/107.4 |
| 3,695,545 | 10/1972 | Peters | 242/107.4 |
| 3,741,494 | 6/1973 | Fiala | 242/107.4 |
| 3,862,726 | 1/1975 | Ulrich et al. | 242/107.4 |

Primary Examiner—Stanley N. Gilreath
Assistant Examiner—John M. Jillions
Attorney, Agent, or Firm—Harness, Dickey & Pierce

[57] ABSTRACT

A vehicular safety belt retractor has belt locking means including a spool with ratchet end flanges, a pawl biased to disengaged relation with respect to the ratchet flanges, and inertia-responsive means for moving the pawl into engagement to block extension of the belt, which is under normal conditions freely extensible. A resilient bearing permits the pawl to move against a stop on the frame under heavy loading.

8 Claims, 6 Drawing Figures

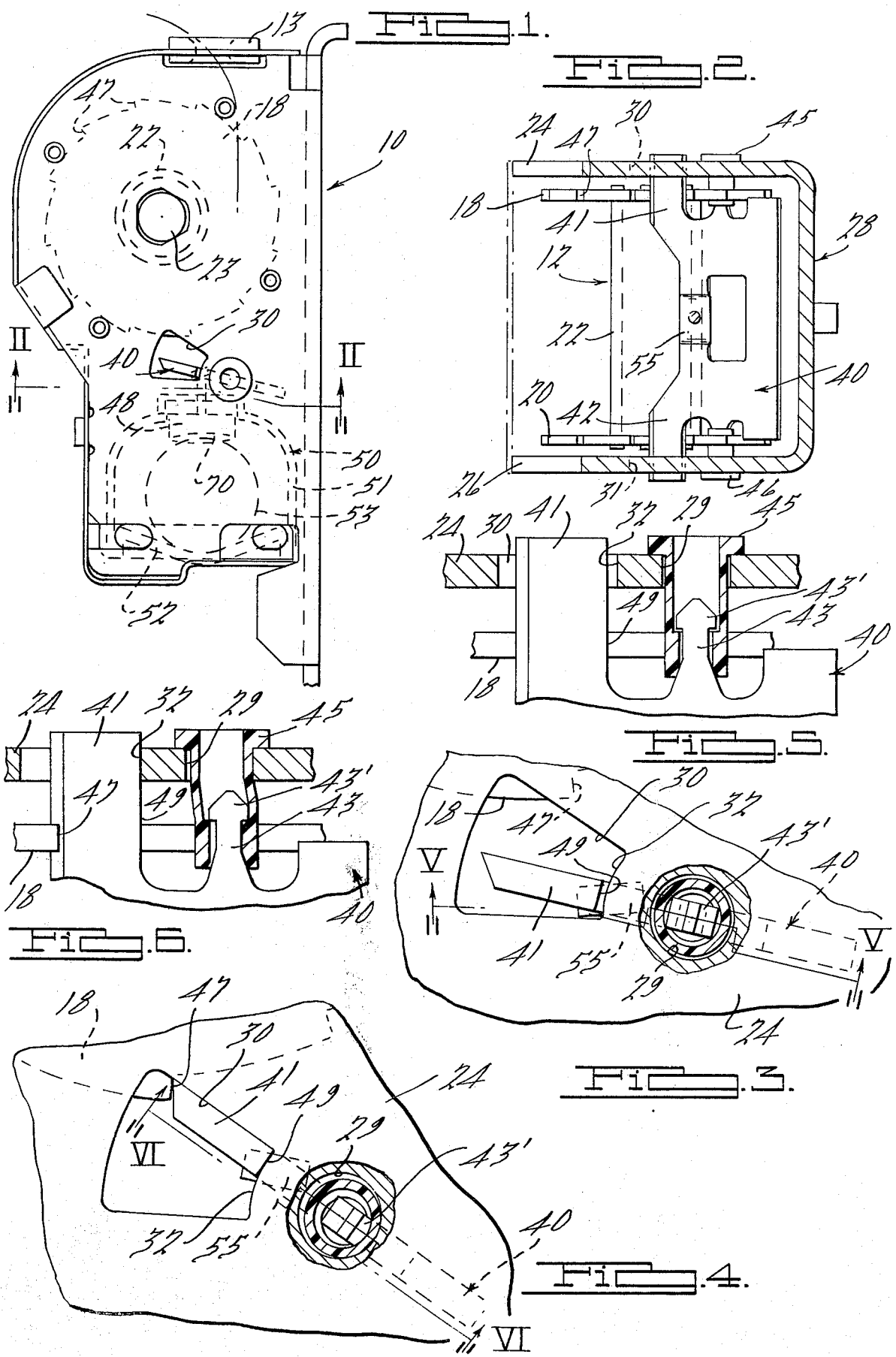

SEAT BELT RETRACTOR

BACKGROUND OF THE INVENTION

Automatically lockable belt retractors intended for automotive use, such as disclosed in my copending U.S. Pat. application, Ser. No. 385,315, filed Aug. 3, 1973, are required to withstand heavy stress loads yet must be of compact construction, and should be as inexpensive and as light in weight as possible. The present invention has as its object to provide an improved lockable retractor of the indicated type which is stronger in proportion to its size, weight and cost, and which is reliable and quiet in operation.

Other objects and advantages will become apparent upon consideration of the present disclosure in its entirety.

BRIEF DESCRIPTION OF THE FIGURES OF DRAWING

FIG. 1 is a side elevational view of a retractor constructed in accordance with the invention;

FIG. 2 is a cross sectional view taken substantially on the line II—II of FIG. 1 and looking in the direction of the arrows;

FIG. 3 is an enlarged fragmentary side elevational view, partly broken away, showing the pawl disengaged;

FIG. 4 is a view similar to FIG. 3 showing the pawl engaged and under a substantial load;

FIG. 5 is a fragmentary cross section on an enlarged scale taken substantially on the line V—V of FIG. 3 and looking in the direction of the arrows; and FIG. 6 is a view similar to FIG. 5 showing the pawl engaged and under load, taken substantially on the line VI—VI of FIG. 4 and looking in the direction of the arrows.

DETAILED DESCRIPTION OF THE PREFERRED EMBODIMENT

Referring now to the drawings, an inertia locking safety belt retractor assembly 10 has a spool 12 upon which a conventional fabric-type seat belt is wound. Although the belt is omitted from the drawing to afford a better view of the mechanism, it extends from the spool out through the guide 13, as indicated in broken lines in FIG. 1. The belt is extendable so that a tongue (not shown) thereon can be detachably secured to a belt buckle (not shown). When the belt is not in use, a coil spring (not shown) acts on spool 12 in a clockwise direction as viewed in FIG. 1, to retract the belt and tongue in the conventional manner. The omitted parts, being well known in the art, are left out in order to clarify and simplify the disclosure of the inventive subject matter.

As best seen in FIGS. 1 and 2, the spool 12 comprises a pair of toothed end flanges 18 and 20 which are rigidly attached to and secured together by a hub sleeve 22 which is fast on a shaft 23 journaled in the side walls 24 and 26 of a rigid frame 28 of U-section. In use the frame 28 may be secured to a structural member of a vehicle by any suitable means to control the extension and retraction of the safety belt assembly.

A pawl 40, the configuration of which is best shown in FIGS. 2 and 3, is trunnioned in the walls 24, 26 below the spool for rotation about an axis parallel to the shaft 23 and has a pair of locking teeth 41, 42 engagable with ratchet teeth 47 on the spool flanges 18 and 20, respectively, to lock the spool 12 against rotation. The portion of the pawl 40 on the toothed side of the trunnion axis is heavier than the other side, so that the pawl is biased to the disengaged position by gravity.

The pawl is adapted to be engaged in event of a crash or panic stop by means of an inertia force-responsive assembly 50, the construction and operation of which are in accordance with the disclosure contained in the aforementioned U.S. Patent application Ser. No. 385,315.

The pawl 40 is formed of heavy gauge sheet steel, and is provided with aligned integral stubshaft portions 43 defining the trunnion axis and upon each of which is fitted a male bearing sleeve 45, 46 formed of a relatively resilient tough plastic, such as solid nylon. The distance between the outer ends of the stubshaft portions is slightly less than the spacing between the inner surfaces of side walls 24, 26, and the bearing sleeves, which are installed from outside the walls 24, 26, extend through and are journaled in holes 29 in the walls. Knob-like enlargements 43' on the ends of stubshaft portions 43 frictionally retain the bearing sleeves. During installation on the stubshaft portions, each knob must pass through a portion of reduced diameter in the internal passage in the sleeve, the sleeve being distorted by such insertion so that it is thereafter firmly held.

The tooth portions 41, 42 of the pawl are tongue-like extensions which extend laterally through openings 30, 31 of generally sector shape in the side walls 24, 26. Each such opening has an inner wall 32, closest to the bearing hole 29. Walls 32 form abutments against which the rear edge walls 49 of the pawl teeth 41, 42 can be forced when the pawl is heavily loaded, thereby transmitting the loading directly through the pawl teeth in compression to the frame and relieving the bearings of any substantial load.

When a heavy load is applied, which tends to rotate the ratchet spool counterclockwise, as viewed in FIGS. 1, 3 and 4 with the pawl engaged, the bearing sleeves 45, 46 distort relatively readily, permitting rearward movement of the pawl until rear edges 49 of teeth 41, 42 engage the walls 32 as mentioned previously and as shown in FIGS. 4 and 6. Until such a load is applied, however, the teeth 41, 42 are clear of walls 32, as shown in FIGS. 3 and 5, and the pawl is therefore freely rockable and sensitively responsive to actuation by the inertia responsive actuating unit 50. The sleeves are not distorted beyond their elastic limit and therefore act as biasing springs to return the pawl to the free position of FIGS. 1, 3 and 5 when the load is relieved.

The inertia force responsive assembly 50 comprises a hollow cylindrical housing 51 for the support of a plunger 48 and which contains a conic seat 52. A relatively heavy solid steel ball 53 is supported on the seat 50 and is engageable with the movable plunger 48.

The plunger 48 is movable along an axis which lies in a place normal to the spool shaft 23, and the flat angular orientation of the lower face 70 of the plunger 48 relative to the axis of movement thereof permits the plunger 48 to move at right angles to the axis of rotation of the pawl 40 and spool 12.

Upon the occurrence of an inertia force greater than a predetermined minimum, the ball or inertia member 53 moves up the conical surface of the seat 52, effects upward movement of the plunger 48, and the upper end portion of the plunger 48 engaging the portion 55 of the pawl 40 moves the teeth 41, 42 thereof into engagement with the ratchet teeth on the flanges 18 and 20 of the spool 12 thereby locking the spool 12 against rotation and precluding protraction of the belt (not shown). If a relatively heavy tensile load is then imposed on the belt, the ratchet teeth move the pawl radially toward the rocking axis thereof until the rear surfaces 49 of the teeth 41, 42 bear directly on the frame at the surfaces 32.

This Detailed Description of the Preferred Embodiment and the accompanying drawings have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A safety belt retractor of the type having a frame, a spool rotatable in the frame, a ratchet wheel rotatable with the spool, a pawl having a tooth portion engageable with but biased away from the ratchet wheel, and bearing means rockably supporting the pawl in the frame, characterized by portions forming a part of said bearing means yieldable in a direction radial to the axis of rocking movement of the pawl to permit movement of the pawl in such radial direction, and cooperating abutment portions on the pawl and frame spaced from the bearing means and engageable with each other in response to such radial movement of the pawl to limit such movement and transmit to the frame radial loading imposed on the pawl by the ratchet wheel.

2. A safety belt retractor as defined in claim 1 including shaft portions extending laterally between the pawl and the frame, said portions yieldable in a radial direction comprising resilient bearing bushings journaling said shaft portions in the frame.

3. A safety belt retractor as defined in claim 1 wherein the frame has spaced side walls, further characterized in that said yieldable portions comprise flexible portions supporting the pawl between and connecting it to the side walls.

4. A safety belt retractor as defined in claim 3 further characterized in that said flexible portions comprise flexible plastic bushings fitted on said shaft portions and extending into openings in said walls.

5. A safety belt retractor of the type having a frame including a pair of spaced parallel walls, a spool rotatably supported in the frame between the walls, a ratchet wheel rotatable with the spool, a pawl having male trunnion bearing portions for rockably supporting the same between the walls and having a tooth portion engageable with the ratchet wheel, the opposite outer ends of said trunnion bearing portions being spaced apart a distance less than the distance between said walls, tubular bearing portions mounted in said walls and overengaged with said trunnion bearing portions and bridging the space between the walls and the ends of said trunnion bearing portions and yieldable in a direction radial to the axis of rocking movement of the pawl to permit movement of the pawl in such radial direction, and cooperating abutment portions on the pawl and on said walls spaced from the bearing portions and engageable with each other in response to such radial movement of the pawl to limit such movement and transmit to the frame radial loading imposed on the pawl by the ratchet wheel.

6. A safety belt retractor as defined in claim 5 further characterized in that said yieldable tubular bearing portions comprise flexible plastic bushings fitted on said shaft portions and extending into openings in said walls.

7. A safety belt retractor of the type having a frame, a spool rotatable in the frame, a ratchet wheel rotatable with the spool, a pawl having tooth means engageable with the ratchet wheel, and bearing means rockably supporting the pawl in the frame, characterized by portions associated with said bearing means yieldable in a direction radial to the axis of rocking movement of the pawl to permit movement of the pawl in such radial direction, and cooperating abutment portions on the pawl and frame spaced from the bearing means and engageable with each other in response to such radial movement of the pawl to limit such movement and transmit to the frame radial loading imposed on the pawl by the ratchet wheel, said tooth means comprising a pair of flat thrust-transmitting tooth portions carried by the pawl and each lying on a radius of the pivot axis of the pawl, the plane of each flat thrust-transmitting tooth portion being parallel to the pivot axis each tooth portion having an outer edge parallel to said pivot axis for engagement with the ratchet wheel, and each tooth portion having an inner edge defining one of said abutment portions on the pawl and engageable with the frame in response to such radial movement of the pawl.

8. A retractor as defined in claim 7 wherein said inner edges are also parallel to said pivot axis.

* * * * *